Aug. 24, 1926.  
A. L. RUTHVEN  
SIMPLEX TRAIN CONTROL  
Filed May 2, 1923

1,597,546

Patented Aug. 24, 1926.

1,597,546

UNITED STATES PATENT OFFICE.

ALFRED L. RUTHVEN, OF ROCHESTER, NEW YORK, ASSIGNOR TO UNION SIMPLEX TRAIN CONTROL CO., INC., OF ROCHESTER, NEW YORK, A CORPORATION OF DELAWARE.

SIMPLEX TRAIN CONTROL.

Application filed May 2, 1923. Serial No. 636,128.

The present invention relates to train controlling apparatus, and aims to provide novel improvements in such apparatus to enhance the utility and efficiency thereof, this invention being an improvement over the apparatus disclosed in my copending application filed March 9, 1923, Serial No. 623,871.

The primary object of the invention is the provision of a train controlling apparatus having novel provision for the reliable and effective transmission of a signal indication or impulse from the track to the vehicle, when the vehicle passes a controlling station, for obtaining vehicle retarding or stopping conditions in the event of caution or danger track conditions, the apparatus not being affected by adverse weather conditions, eliminating contact devices between the track and vehicle, and avoiding objectionable obstructions on the track or vehicle.

Another object is the utilization of inductors or control elements on the track associated with non-magnetic rail sections at the control stations, whereby the receivers or responsive devices on the vehicle can cooperate with or be influenced by the inductors or control elements in an efficient and dependable manner, the cooperating elements of the track and vehicle being associated with a rail of the track to provide for a minimum clearance between them and to also avoid objectionable obstructions on the track or vehicle.

A further object is the provision of rail responsive means, when using the non-magnetic rail sections at control stations, for rendering the signal responsive means effective when passing non-magnetic rail sections, for cooperation with the control inductors or elements associated with such rail sections.

A still further object is to associate with non-magnetic rail sections at the control stations, inductors having electrical circuits for rendering them effective and ineffective when the circuits are opened and closed, respectively, with responsive means carried by the vehicle for obtaining vehicle retarding conditions when the responsive means passes an inductor with its circuit opened.

The invention has for another object the provision of such apparatus having means for obtaining different vehicle controlling conditions from the inductors or control elements located at the control stations, to provide for clear, caution and danger vehicle conditions according to the track conditions, when passing a control station.

Still another object is the elimination of mechanical operations, and to simplify the apparatus so as to render the operation and control more certain and facile.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

*Normal running circuit.*

Figure 1:
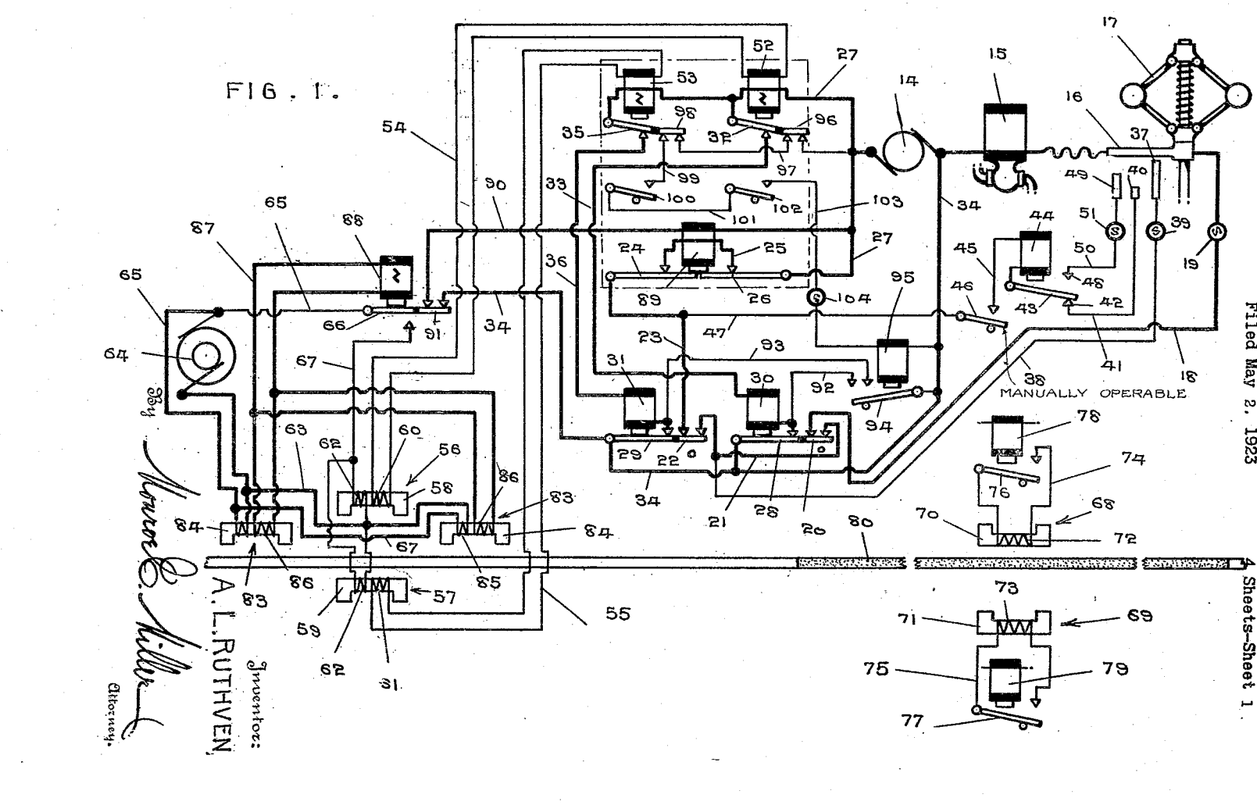
Figure 1 is a diagrammatical view of the preferred form of apparatus using the non-magnetic rail section at control stations and providing for clear, caution and danger conditions.

The vehicle equipment includes an electro-magnet 15 which controls an air valve or other device, so that when said magnet is deenergized the brakes are applied, the steam, electrical or other power shut off, or both, so that such magnet must be kept energized in order that the locomotive or train can proceed. The circuit of the magnet 15 includes a direct current generator 14, or other source of electrical energy, the magnet 15, a movable contact brush or blade 16 carried by a centrifugal speed control governor 17, a conductor 18 which may have a white electric lamp 19 therein for indicating clear conditions when the lamp is lighted, a switch 20, conductor 21, switch 22, conductor 23, switch 24, conductor 25, switch 26 and conductor 27. The opening of any of said switches will open the circuit so as to deenergize the magnet 15 and apply the brakes, and the same result is obtained by the breaking, shorting or grounding of the circuit.

The switches 20 and 22 are carried by and insulated from the respective switches 28 and 29 under the influence of the corresponding electro-magnets 30 and 31, which, when energized, hold said switches closed.

The magnet 30 is in a normally closed circuit including the generator 14, conductor 27, switch 32, conductor 33, magnet 30, switch 28 and conductor 34, and the opening of the switch 32 will open such circuit so as to deenergize the magnet 30. This will permit the switches 20 and 28 to drop open, and the switch 28 having been released cannot be reclosed unless the circuit of the magnet 30 is completed through some other channel. The switch 20 being opened will establish caution conditions, as will hereinafter more fully appear.

The magnet 31 is also in a normally closed circuit including the generator 14, conductor 27, switch 35, conductor 36, magnet 31, switch 29 and conductor 34, whereby the opening of the switch 35 will deenergize the magnet 31 and permit the switches 22 and 29 to drop open. The switch 29 having moved open will prevent the switch from being reclosed unless the circuit of the magnet 31 is completed through some other connection, thereby keeping the switch 22 open until the magnet 31 is reenergized; and the opening of switch 28 obtains danger vehicle conditions, as will hereinafter more fully appear.

Caution speed control circuit.

The deenergization of the caution magnet 30 and opening of the caution switch 20 will produce caution conditions in the vehicle equipment, with the switch 22 closed. Under these conditions, the circuit of the magnet 15 includes a speed control shunt paralleling the switch 20. The circuit of the magnet 15 now includes the generator 14, magnet 15, brush 16, a caution contact strip 37 arranged to be engaged by the brush 16 when the vehicle is travelling below a predetermined speed (say from fifteen to thirty miles an hour or less), conductor 38 which may include a green or yellow electric lamp 39 for indicating caution conditions when lighted, conductor 21 (conductor 18 and switch 20 being shunted by the contact strip 37 and conductor 38), switch 22, conductor 23, switch 24, conductor 25, switch 26 and conductor 27. The strip 37 is of such a length that the brush 16 will be removed therefrom, to open such caution control circuit, when the allotted speed is exceeded, thereby deenergizing the magnet 15 to apply the brakes. Caution speed control therefore obtains when the switch 20 is open and switch 22 is closed, compelling the completion of the circuit by way of the caution control contact strip 37 of the speed control device. The governor 17 is operated from a wheel or other movable member, for rotating the governor according to the speed of the vehicle, and for raising the brush 16 in accordance with the limiting speed. If the speed of the vehicle, under such caution conditions, is exceeded, the brush 16 will be lifted off the contact strip 37 so as to open the circuit of the magnet 15 and to apply the brakes until the speed is reduced and the brush 16 returned to the strip 37.

Danger speed control circuit.

A more reduced speed is required under danger conditions than under caution conditions, and the train must first be brought to a stop before it can proceed, after a danger indication is received by the vehicle equipment, this being brought about by the opening of the switch 22, which will enforce danger speed control until the switch 22 is again closed. The danger speed control circuit shunts the conductor 18 and switches 20 and 22, and also shunts the contact strip 37 and conductor 38 of the caution speed control circuit. Such danger speed control circuit includes the generator 14, magnet 15, brush 16, a contact 40 engaged by the brush 16 when the vehicle has come to a complete stop, conductor 41, contact 42, switch 43 normally engaging said contact, an electromagnet 44, conductor 45, engineer's or motorman's switch 46, conductor 47, conductor 23, switch 24, conductor 25, switch 26, and conductor 27. Thus, when the vehicle has come to a stop, with the brush 16 engaging the contact 40, and the engineer or motorman holds the switch 46 closed, the circuit of the magnet 15 is completed, to reenergize the magnet 15 and release the brakes. The magnet 44 is also energized, thereby attracting the switch 43 and removing said switch from the contact 42 against a contact 48, so as to change the circuit connections to permit the train to proceed at a slow speed under danger conditions. The danger speed control circuit, after the change in circuit connections by the energization of the magnet 44, now includes the generator 14, magnet 15, brush 16, a danger speed control contact strip 49, which is shorter than the contact strip 37 to restrict the speed to twelve miles per hour or less, conductor 50 which may include a red danger electric lamp 51 to indicate danger conditions when the lamp is lighted, contact 48, switch 43, magnet 44, conductor 45, switch 46 held closed, conductor 47, switch 24, conductor 25, switch 26 and conductor 27. The vehicle can then proceed below the maximum danger speed, the brush 16 sliding upward on the strip 49 as the speed increases, and if such maximum danger speed is exceeded, the brush 16 is removed from the strip 49, which will not only deenergize the magnet 15 and apply the brakes, but which will also deenergize the magnet 44, letting the switch 43 drop away from the contact 48 back against the contact 42. This will open the circuit through the contact strip 49, thereby keeping the brakes applied until the train is again brought to a stop to return the brush 16 against the contact 40, in which event the switch 43 is again lifted into connection with the contact 48 so that the vehicle can proceed again under danger speed control. A stop will be enforced, however, whenever the danger speed is exceeded under these conditions.

The danger speed control prevails whenever the switch 22 is open, compelling the completion of the circuit of the magnet 15 by way of either the contact 40 or contact strip 49, the path for the current through the conductors 18 and 38 being cut off. This is true whether or not the switches 20 and 28 are open, because the switch 22 when opened will itself open the circuits of the conductors 18 and 38.

The speed permitted under danger conditions is sufficiently slow to enable a quick stop to be made, but the train can proceed, should the apparatus be out of commission or other contingency exist, for otherwise the train might be locked against any advance movement with the brakes set.

*Responsive devices.*

The switches 32 and 35 which control the circuits of the respective caution and danger magnets 30 and 31, are parts of responsive control relays including the alternating current electro-magnets 52 and 53, respectively. Said magnets 52 and 53 are disposed in the respective circuits 54 and 55 with the inductive responsive elements or receivers 56 and 57. The receivers 56 and 57 comprise the iron cores 58 and 59, respectively, on which are wound the secondary coils 60 and 61 disposed in the respective circuits 54 and 55. The receivers comprise transformers, there being primary windings or coils 62 on the cores 58 and 59, for inducing alternating current in the circuits 54 and 55 by the well-known transformer principle, the alternating magnetic flux established in the cores by the flow of alternating current in the primary coils inducing the flow of current in the secondary coils and their circuits. The secondary coils have a larger number of turns than the primary coils so that the current induced in the circuits 54 and 55 will be of higher potential than in the primary circuit, which includes a conductor 63 connected to one terminal of each coil 62, an alternating or pulsating current generator 64, a conductor 65, switch 66 and conductor 67 connected to the other terminals of said coils 62. When the switch 66 is closed the alternating or pulsating current flowing in the coils 62 will therefore induce current in the circuits 54 and 55 to energize the magnets 52 and 53.

The arrangement is such that when the switch 66 is closed so as to bring the primary coils 62 in circuit with the generator 64, with the receivers energized and located adjacent to a non-magnetic rail section, the induction of maximum current in the circuits 54 and 55 is impeded, owing to the fact that the magnetic circuits of the cores 58 and 59 are not completed. Said cores are of U-shape with their ends or poles depending therefrom to pass over the track inductors as hereinafter described. Thus, when said cores are not over an iron or magnetic portion of the track, the magnetic circuits of the receivers 56 and 57 include the air gaps between the ends of the cores, resulting in magnetic impedance in the transformer receivers, to minimize the potential of the current flowing in the circuits 54 and 55 and their magnets 52 and 53, respectively. However, when the receivers 56 and 57 pass over iron or magnetic members so that the magnetic circuits of the cores 58 and 59 are completed through the iron or magnetic objects on the track, the impedance to the magnetic flux being reduced will result in current of higher potential being induced in the secondary coils 60 and 61 and corresponding circuits 54 and 55. This will energize the magnets 52 and 53 to a sufficiently higher degree to positively and effectively pick up or open the switches 32 and 35. Said switches normally remain down even when the magnets 52 and 53 are energized through the transformer receivers, with said receivers away from an iron or magnetic portion of the track, but when the receivers move adjacent to iron or magnetic objects in close proximity thereto, the increased current in the circuits 54 and 55 will sufficiently over-energize the magnets 52 and 53 so as to lift and open the switches 32 and 35. This responsive action, for opening either or both of the switches 32 and 35, is employed for obtaining caution and danger vehicle controlling conditions, when passing a control station.

At each control station there are provided the control elements or inductors 68 and 69 spaced apart transversely of the track, and the receivers 56 and 57 are spaced apart transversely of the vehicle so as to pass over the inductors 68 and 69, respectively, when passing a control station. The inductors or inductive control elements 68 and 69 comprise the respective cores 70 and 71 on the track having the choke coils 72 and 73 wound thereon. Said cores 70 and 71 are of U-shape with their ends or poles projecting upwardly so that the cores 58 and 59 move closely over the cores 70 and 71, respectively, with a small clearance between them to avoid physical contact. The choke coils 72 and 73 are disposed in the respective circuits 74 and 75 with the control switches 76 and 77. The switches 76 and 77 are under the influence of track electro-magnets 78 and 79, respectively, which are located in the corresponding circuits of the wayside signal or semaphore apparatus, whereby under clear conditions both magnets 78 and 79 are energized to hold the switches 76 and 77 closed to make the choke coils 72 and 73 effective, so that the inductors 68 and 69 are ineffective for producing caution or danger conditions in the vehicle equipment; the magnet 79 being energized and the magnet 78 deenergized for caution track conditions, with the switch 77 closed and the switch 76 open, so that the inductor 68 is effective for the transmission of a caution impulse or signal to the vehicle equipment, the inductor 69 being ineffective; and the magnet 79 being deenergized and the switch 77 open for danger track conditions, to render the inductor 69 effective for transmitting a danger impulse or signal to the vehicle equipment, with the magnet 78 energized or deenergized, preferably the latter. When either receiver of the vehicle passes over the corresponding track inductor, say for example, the receiver 57 over the inductor 69, with the receiver energized, different effects are felt in the vehicle equipment, depending on whether or not the choke coil circuit of the inductor is open or closed. Thus, when the inductor circuit 75 is open due to the switch 77 being open by the deenergization of the magnet 79, or the circuit 75 being broken, the inductor 69 will be effective on the receiver 57, and when the receiver moves over the inductor, the cores 59 and 71 complete a magnetic circuit, whereby the voltage of the current induced in the circuit 55 will be materially increased, to energize the magnet 53 sufficiently to pick up the switch 35 with certainty. However, when the switch 77 is closed, the choke coil 73 will be effective, so as to resist or impede the flow of alternating magnetic flux through the core 71 from the core 59, and this will impede the induction of current in the circuit 55 so as to prevent the magnet 53 being energized sufficiently to attract and open the switch 35, so that the effect of the choke coil 73 is as though the inductor 69 were absent, so far as the opening of the switch 35 by the magnet 53 is concerned.

What has been said concerning the receiver 57 and inductor 69 also applies to the receiver 56 and inductor 68 and corresponding parts, the action being the same for both receivers, inductors and corresponding parts. When either receiver moves over the corresponding inductor, with the inductor circuit open or broken, the corresponding responsive device is affected so as to obtain either a caution or danger condition in the vehicle equipment, but when the circuits of the choke coils are closed, the effect is as though the track inductors were not present, so far as the opening of the switches 32 and 35 by the magnets 52 and 53 is concerned. The control of the vehicle equipment for different conditions is therefore had by the movement of the receivers 56 and 57 over the corresponding track inductors with the inductor circuits both closed for clear conditions and opened selectively for caution and danger conditions.

Figures 4, 5, 6, 7:
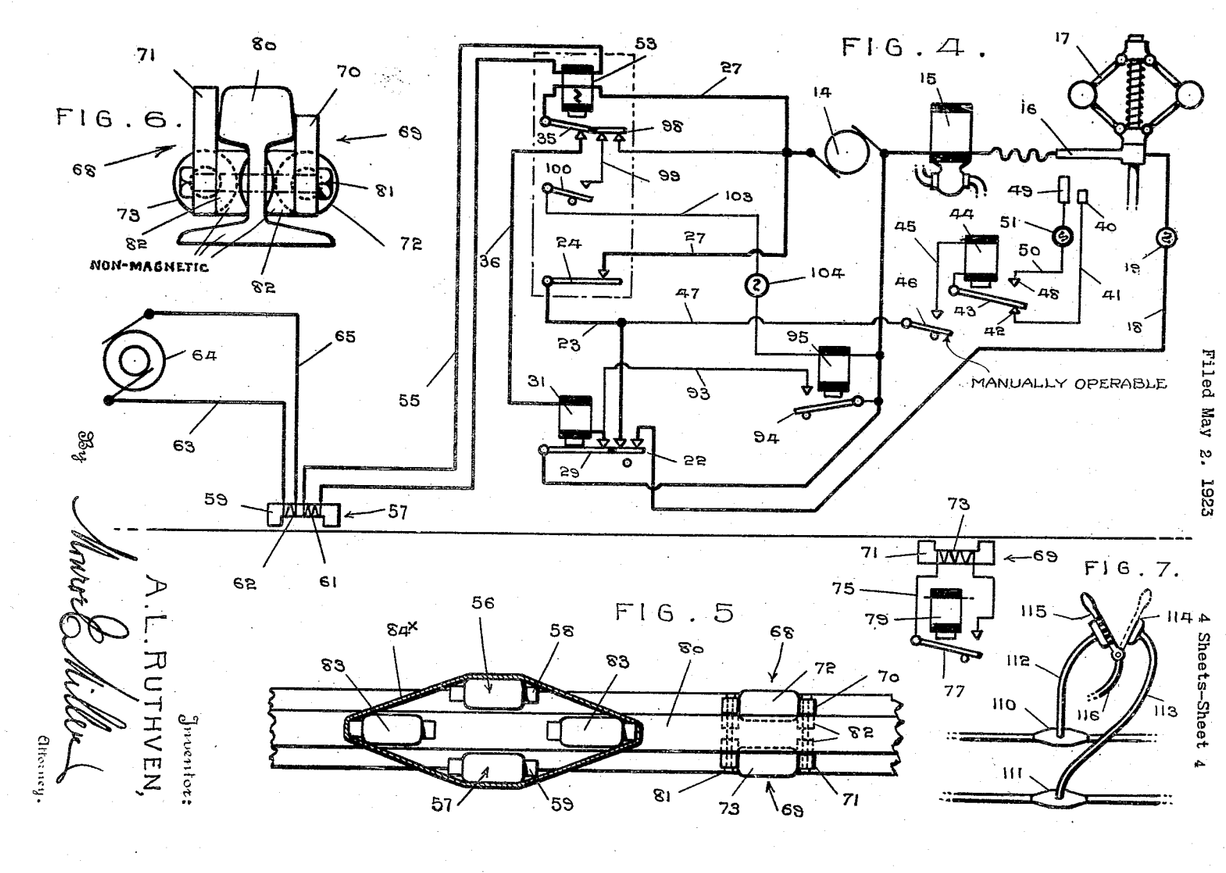
Fig. 4 is a diagrammatical view of a more simple form of apparatus providing for clear and danger control only, without the non-magnetic rail section.
Fig. 5 is a plan view showing a set of inductors and receivers, showing same associated with a non-magnetic rail section.
Fig. 6 is an enlarged end view of a pair of inductors associated with a non-magnetic rail section.
Fig. 7 is a diagrammatical view illustrating the use of two sets of receivers with reversing means to take care of the movement of the vehicle in opposite directions.

In the embodiment of the invention as shown in Fig. 1, the receivers and inductors are associated with the rail of the track so as to provide for minimum clearances between the receivers and inductors, so that the best responsive effect or action can be obtained, and the association of the receivers and inductors with the rail will also eliminate objectionable obstructions on the track or vehicle which are apt to be knocked off, damaged or damage productive. In order to accomplish this, the rail includes a non-magnetic section 80 at each control station, with which the inductors 68 and 69 are associated, said inductors being preferably secured to the non-magnetic rail section 80 at opposite sides thereof, as seen in Figs. 5 and 6. In this way, the inductors are secured directly to the rail to be carried and protected thereby, and to be out of the way, as well as permitting the receivers to move closely over the inductors with the best inductive cooperation between them. As shown in Figs. 5 and 6, the ends or poles of the cores 70 and 71 extend upwardly at the opposite sides of the tread or head of the rail, with the choke coils 72 and 73 at the opposite sides of the web of the rail, and said cores are fastened to the rail at the opposite sides by the clamping bolts 81 or other means, it being preferable to provide non-magnetic spacers 82 between the cores and the web of the rail. The receivers 56 and 57, as seen in Fig. 5, are disposed at opposite sides of the rail to move over the inductors 68 and 69, respectively, and the inductors and receivers are spaced apart transversely sufficiently so as not to permit of inductive interference between them. In other words, the inductors and receivers are spaced apart transversely sufficiently so that each receiver is only influenced by the corresponding inductor, and the rail being of non-magnetic material between the inductors will space them apart with non-magnetic material between them, so that the magnetic field of each inductor is, practically considered, independent of the other. The inductors are thus conveniently fastened to the non-magnetic rail section, providing a compact arrangement, and the inductors are out of the way and are not apt to be knocked off, damaged or removed. In fact, the inductors can be so permanently secured to the rail section 80 as to practically preclude the removal of the inductors, and to assure of the cores 70 and 71 being present to obtain caution or danger conditions in the vehicle equipment if the track circuits are broken, shorted, grounded or otherwise inoperative.

The receivers 56 and 57 can move closely adjacent to the rail so as to pass over the inductors with minimum clearance, in order that the magnets 52 and 53 can be influenced with the most efficient action, and the minimum clearance will also enable the inductors and receivers of minimum size to be used, it of course being desirable that the cores of the receivers and inductors come as close together as possible, and this applies when using inductive receivers of different kinds that may be utilized in the apparatus.

In order that the receivers 56 and 57 and magnets 52 and 53 will not be operative when moving along the iron or magnetic portion of the rail, rail-responsive receivers or control elements 83 are provided including the cores 84 similar to the cores 58 and 59 and moving immediately above the rail and disposed slightly in advance of and behind the impulse receivers 56 and 57. The receivers 56, 57 and 83 are arranged in a group, as seen in Fig. 5, to be carried as a single unit in a suitable casing 84ˣ, with the receivers 56 and 57 spaced apart transversely to move along opposite sides of the rail, and the receivers 83 spaced apart longitudinally to move immediately over the rail in advance and rear of the receivers 56 and 57. The receivers 83 are also of the transformer type, similar to the receivers 56 and 57, and have the primary coils 85 thereon, one terminal of each coil being connected to the conductor 63 and the other terminal to the conductor 65, so that each coil 85 is continually energized by the generator 64 during operative conditions. The primary coils 85 thus induce current of higher potential (the receivers 83 being preferably of the character of step-up transformers) in the secondary coils 86 wound on the cores 84, and said secondary coils 86 are connected in parallel or multiple with an alternating current electro-magnet 88 which controls the switch 66. The magnet 88 may be termed a "rail-responsive magnet", because it is energized to hold the switch 66 open when the receivers 83 are over an iron or magnetic portion of the rail, whereas the magnet 88 is partly deenergized to release the switch 66 when both receivers 83 are over a non-magnetic portion of the rail, such as the rail section 80. The magnetic circuits of the cores 84 are completed by the iron or magnetic portion of the rail so that maximum current is induced in the secondary coils 86 to energize the magnet 88 sufficiently to hold the switch 66 open, and the magnet 88 is held energized to keep the switch 66 open should only one receiver 83 move over a short non-magnetic portion of the rail, such as a manganese bronze or similar crossing, frog, switch point, or the like. In this way, the closing of the switch 66 is avoided when passing short non-magnetic portions in the rail, which are shorter than the distance between the receivers 83. The receivers 83 are so spaced apart longitudinally of the rail that in passing over non-magnetic crossings said receivers will not both be simultaneously over non-magnetic portions, it being the general practice to use non-magnetic inserts or portions only at the points where the rails intersect. If the non-magnetic rail section is longer than the distance between the receivers 83, so that the magnet 88 is sufficiently deenergized to release the switch 66, then there being a non-magnetic portion of the rail between the receivers 83, will assure of the absence of a magnetic portion of the rail or track under the receivers 56 and 57, so that false caution or danger conditions will not be established in the vehicle equipment when passing non-magnetic rail sections of any length. The receivers 83 are thus used to render the receivers 56 and 57 inoperative when moving along magnetic portions of the rail, and effective when moving along non-magnetic sections of the rail at the control stations. When either or both of the receivers 83 are over an iron or magnetic portion of the rail, the magnet 88 is energized sufficiently to hold the switch 66 open, thereby opening the circuit of the primary coils 62 of the receivers 56 and 57, so that the magnets 52 and 53 are deenergized completely. When both receivers 83 have moved over the non-magnetic rail section 80 at a control station, then the magnet 88 is deenergized sufficiently to release the switch 66, which in closing will connect the primary coils 62 in circuit with the generator 64 so as to energize the circuits 54 and 55 and their magnets 52 and 53, the receivers 56 and 57 being energized for cooperation with the inductors.

By using the rail responsive or detecting receivers 83, it will be noted that the rear receiver 83 will remain on the magnetic portion of the rail until the receivers 56 and 57 have moved to a position over the non-magnetic rail section, and the front receiver 83 moves over the iron or magnetic portion of the rail, when leaving the non-magnetic rail section, before the receivers 56 and 57 reach the magnetic portion, whereby the receivers 56 and 57 are only energized after they have been moved to a position over the non-magnetic rail section and are deenergized before leaving the non-magnetic rail section.

Safety device.

A safety device is used to assure of the magnets 52 and 53 being sufficiently energized to obtain the required impulses therein for opening the switches 32 and 35, when passing a control station, should the inductor circuits be opened. Thus, a normally energized holding electro-magnet 89 is provided for holding the switches 24 and 26 closed when travelling between or beyond control stations, and the safety or holding magnet 89 is disposed in a circuit including the generator 14, conductor 27, magnet 89, conductor 90, switch 91 carried by and insulated from the switch 66, and conductor 34. When the receivers move along a non-magnetic rail section, so that the magnet 88 releases the switch 66, the switch 91 is opened to deenergize the magnet 89 and the safety switches 24 and 26 are then held closed by the magnets 52 and 53 when energized. The switches 24 and 26 are under the influence of the corresponding magnets 53 and 52 when passing a non-magnetic rail section, and the switches 24 and 26 are of sufficient weight or influence so as to drop open if the magnets 53 and 52 are not energized up to the required amount when the switch 66 is released and closed. Accordingly, when passing a control station the duty of holding the safety switches 24 and 26 (controlled jointly by magnets 52, 53 and 89) closed is transferred from the magnet 89 to the respective magnets 53 and 52, and said responsive magnets 53 and 52 must be energized sufficiently to hold the switches 24 and 26 closed. Otherwise, either or both of the switches 24 and 26 will open, to deenergize the magnet 15 and stop the vehicle. This safety provision assures of the responsive devices being in proper operative condition when passing a control station, so as to assure of the switches 32 and 35, or either of them, being picked up or opened when the receivers pass the track inductors with both or either of the inductor circuits opened accordingly.

Clearing device.

The speed control of the vehicle is terminated when the vehicle passes a control station with both inductors 68 and 69 in clear condition, that is, with their circuits closed. An intermediate energization of the magnets 52 and 53 is utilized for obtaining the clearing or speed control termination action, as will presently appear, and the normal running circuit is reestablished by energizing the magnets 30 and 31 to pick up and hold the respective switches 28 and 29. In order to energize the magnets 30 and 31, conductors 92 and 93 are connected with said magnets and can be connected by a switch 94 with the conductor 34, thereby shunting the switches 28 and 29, so that when the switch 94 is closed, with the switches 32 and 35 closed, the magnets 30 and 31 will be energized to attract and hold the switches 28 and 29, thereby closing the switches 20 and 22, and reestablishing the normal running circuit, so that the vehicle can proceed unrestricted. The switch 94 is under the influence of a clearing or speed control terminating electro-magnet 95, and in the arrangement as shown in Fig. 1, the magnet 95 is only energized to close the switch 94 when the receivers 56 and 57 pass the track inductors with the inductor circuits closed, so as to obtain intermediate energizations of the magnets 52 and 53. The clearing circuit includes the generator 14, a switch 96 carried by and insulated from the switch 32, conductor 97, a switch 98 carried by and insulated from the switch 35, conductor 99, switch 100, conductor 101, switch 102, conductor 103, magnet 95 and conductor 34. The switches 96 and 98 are closed when the corresponding switches 32 and 35 are closed, and when the last named switches are opened the switches 96 and 98 are opened. The switches 100 and 102 are under the influence of the corresponding magnets 53 and 52, to be raised and closed when said magnets are energized to at least an intermediate degree.

There are four different degrees or magnitudes of energization of the responsive control magnets 52 and 53 which are used for control purposes. Thus, when the energized receivers 56 and 57 pass along a non-magnetic rail section away from the inductors, the magnets 52 and 53 are energized to a normal amount or degree, with the current in circuits 54 and 55 reduced owing to the incomplete magnetic circuits of the receivers. This normal energization of the magnets 52 and 53 is necessary, when passing a control station, for holding the safety switches 26 and 24 closed after being released by the magnet 89, because if the magnets 52 and 53 are not energized normally when passing a control station, with the switches 66 and 91 opened and the magnet 89 deenergized, the switches 24 and 26 will be released to deenergize the magnet 15. Thus, if the magnets 52 and 53 are only energized a subnormal degree, such energization will not be sufficient to hold the switches 24 and 26 closed, and the brakes will be applied by the opening of the circuit of the magnet 15, which assures of the responsive devices being in operative condition when passing a control station. When the responsive devices 56 and 57 pass the track inductors with the circuits of the choke coils open, then, the cooperation of the cores of the receivers and inductors, will result in increased current being induced by the transformer receivers in the circuits 54 and 55, and this will bring the magnets 52 and 53 to full or controlling energization for opening the switches 32 and 35 with a positive and reliable action. When the inductor circuits are closed so that the choke coils are effective for impeding the flow of magnetic flux in the receivers 56 and 57, and to prevent the magnets 52 and 53 from being sufficiently energized to open the switches 32 and 35, the presence of the inductors below the receivers will, however, result in a partial increase in the induction of current in the circuits 54 and 55 from the primary coils 62, so that the magnets 52 and 53 are energized to a degree intermediate the normal and full or controlling degrees, whereby the switches 100 and 102 are closed by said magnets, although the switches 32 and 35 are not affected.

From tests and demonstrations made, current of 110 volts is induced in the circuits 54 and 55 with the receivers over a non-magnetic rail section away from the inductors; the current in said circuits will be increased to 140 volts or higher when the receivers pass over the inductors with the choke coil circuits open, whereas when the receivers pass over the inductors with the choke coil circuits closed the current voltage in said circuits will increase to about 120 or 125 volts. The voltage used and changes in voltage obtained can be varied and regulated, and the above voltages are only referred to as being typical of preliminary tests made. Thus, when the magnet 89 releases the safety switches 24 and 26, using the voltages above given, the magnets 52 and 53 must be energized with current of 110 voltage to hold said switches closed, while passing a control station, or the switches will drop open and stop the train. If the magnets 52 and 53 are energized the full or controlling amount (140 volts) or to a degree appreciably more than the intermediate degree, say from 130 volts upward, the switches 32 and 35 will be attracted and opened. The switches 100 and 102 will also be attracted and closed, but the circuit of the magnet 95 is not completed owing to the switches 96 and 98 being opened with the switches 32 and 35. When the magnets 52 and 53 are energized an intermediate degree, say between 115 and 125 volts, the switches 100 and 102 are attracted and closed, but the switches 32 and 35 remain closed. This will obtain the clearing action by closing the switches 100 and 102 with the switches 96 and 98 closed, so that the magnet 95 is energized to close the clearing switch 94. When passing a control station, the magnets 52 and 53 must be energized up to the normal degree, say 110 volts, or the safety switches 24 and 26 or one of them will open, to stop the train, and this will assure of the responsive devices being in full operative condition. Such being the case the switches 32 and 35 or one of them will be attracted and opened by the magnets 52 and 53 or one of them according to the condition of the inductors. The switches 32 and 35 are such as to be freely movable under the attraction of the magnets 52 and 53 when energized with the receivers over the inductors and the inductor circuits open. To obtain the clearing action, the energization of the magnets 52 and 53 above normal must be obtained, but not sufficient to open the switches 32 and 35, because all four switches 96, 98, 100 and 102 must be closed at the same time to close the circuit of the clearing magnet 95. The switches 24, 35 and 100 of the magnet 53 and switches 26, 32 and 102 of the magnet 52 thus serve as a check one on the others, to assure of proper working conditions in the vehicle equipment.

Operation.

*Clear conditions.*—With the train proceeding under clear conditions between or beyond the control stations, the normal running circuit is closed so as to keep the magnet 15 energized, such circuit including the generator 14, magnet 15, brush 16, conductor 18, switch 20, conductor 21, switch 22, conductor 23, switch 24, conductor 25, switch 26 and conductor 27. The lamp 19 is also lighted to indicate clear conditions. The magnet 30 is kept energized to hold the switches 28 and 20 closed, by being included in the circuit including the generator 14, conductor 27, switch 32, conductor 33, magnet 30, switch 28 and conductor 34. The magnet 31 is kept energized to hold the switches 29 and 22 closed by being in the circuit including the generator 14, conductor 27, switch 35, conductor 36, magnet 31, switch 29 and conductor 34. The magnet 89 is in a normally closed circuit to keep the switches 24 and 26 closed, and such circuit includes the generator 14, conductor 27, magnet 89, conductor 90, switch 91 and conductor 34. The magnet 88 is kept energized to hold the switch 66 open and the switch 91 closed, when the receivers are moving over an iron or magnetic portion of the rail, it being noted that the primary coils 85 of the receivers 83 are continually energized, whereby the completion of the magnetic circuits of the cores 84 by the rail will result in sufficient current being induced in the secondary coils 86 to energize the magnet 88 sufficiently to hold the switch 66 open. The switch 66 being open will open the circuit of the primary coils 62 of the receivers 56 and 57, so that the magnets 52 and 53 are deenergized.

Under clear track conditions, both switches 76 and 77 are closed so as to close the choke coil circuits of the inductors.

Now, when the receivers 83 have both moved over the non-magnetic rail section at a control station, so as to interrupt the magnetic circuits of said receivers, the magnet 88 is deenergized sufficiently to release the switch 66, which will close, thereby opening the switch 91. The switch 66 being closed will close the circuits of the primary coils 62, thereby inducing sufficient current in the circuits 54 and 55 to energize the magnets 52 and 53 for holding the switches 26 and 24 closed when the magnet 89 is deenergized by the opening of the switch 91. While running along an iron or magnetic portion of the rail, the magnets 88 and 89 are energized to hold the corresponding switches closed, but when running along a non-magnetic portion or section of the rail, the magnets 88 and 89 are deenergized and the magnets 52 and 53 are energized, said magnets 88–89 and 52–53 being alternately energized as the receivers move along magnetic and non-magnetic portions or sections of the rail. The receivers 56 and 57 are thus energized when passing a control station along the non-magnetic rail section, and if the magnets 52 and 53 are not energized up to the normal voltage, then the switches 24 and 26 will be released to open the normal running circuit and produce a danger condition in the vehicle equipment.

When the receivers 56 and 57 pass over the track inductors 68 and 69, respectively, the alternating magnetic flux of the receivers will make effort to pass through the cores of the inductors, but the choke coils of the inductors being in closed circuits, will resist such flow of magnetic flux through the inductors, and this will prevent the increase in voltage in the magnets 52 and 53 sufficient to raise the switches 32 and 35, whereby the normal running circuit remains closed so as to continue the clear conditions in the vehicle equipment.

When the receivers 56 and 57 are moving from the magnetic to the non-magnetic rail sections, the rear receiver 83 will keep the magnet 88 energized until the receivers 56 and 57 have moved completely beyond the magnetic rail section, so as to prevent premature energization of the receivers 56 and 57 while they are close to a magnetic portion of the rail. When leaving the non-magnetic rail section, the front receiver 83 will pass over the iron or magnetic portion of the rail beyond the non-magnetic rail section, before the receivers 56 and 57, thereby reenergizing the magnet 88 and deenergizing the receivers 56 and 57 before they pass adjacent to the magnetic portion of the rail. In this way, the receivers 56 and 57 are only energized and operative while moving along a non-magnetic portion or section of the rail.

*Caution conditions.*—Under caution track conditions, the switch 77 is closed to render the choke coil 73 effective, and the switch 76 is open so as to render the choke coil 72 ineffective.

The same circuit changes occur in the vehicle equipment, as under clear conditions, when the receivers move along the non-magnetic rail section 80, and when the receivers 56 and 57 move over the inductors, the circuit of the inductor 69 being closed will prevent the magnet 53 being energized sufficiently to pick up the switch 35. However, the receiver 56 passing over the core 70 with the circuit of the choke coil 72 opened, will result in the free flow of magnetic flux from the core 58 through the core 70 while the receiver 56 is passing over the inductor 68, and the impulse thus provided will result in the increase in voltage in the circuit 54 and magnet 52 whereby the switch 32 is attracted to said magnet and opened. This will immediately deenergize the magnet 30 and open the switches 20 and 28, thereby opening the normal running circuit at the switch 20, and the caution speed control circuit is now established.

The caution speed control circuit includes the generator 14, magnet 15, brush 16, contact strip 37, conductor 38, switch 22, conductor 23, switch 24, conductor 25, switch 26 and conductor 27, the conductor 18 and switch 20 being shunted by the contact strip 37 and conductor 38. Should the train be moving above caution speed with the brush 16 above the contact strip 37, the magnet 15 will be deenergized to reduce the speed, and when the brush 16 engages the contact strip 37, the magnet 15 will be reenergized so that the train can proceed under caution speed but not above such speed. Should the speed allotted be exceeded, the brush 16 being removed from the strip 37 will immediately open the circuit of the magnet 15 and apply the brakes, thereby compelling obedience to the caution conditions.

The caution speed control circuit is continued through the block, after passing the control station set for caution conditions, and when the magnet 88 is reenergized by the movement of the receivers along the magnetic portion of the rail, so that the magnets 52 and 53 are deenergized, the magnet 89 is energized for holding the safety switches 24 and 26 closed. The switches 20 and 28 remain open, however, to continue the caution conditions until the magnet 30 is energized by the closing of the switch 94, as will hereinafter more fully appear.

*Danger conditions.*—When danger track conditions exist, the switch 77 is open, and the switch 76 is also preferably opened although not necessarily.

Thus, when passing the control station, with the receivers 56 and 57 energized by the deenergization of the magnet 88, the receiver 57 in passing over the inductor 69, with the circuit of the choke coil 73 opened, will result in the voltage of the induced current in the circuit 55 being increased so that the magnet 53 attracts and opens the switch 35, it being kept in mind that the induced current in the circuits 54 and 55 must be normal, when passing a control station, or the safety switches 24 and 26 will open. The switch 35 being opened will immediately deenergize the magnet 31 and release the switches 22 and 29, and the switch 29 having opened cannot be closed until the magnet 31 is reenergized through the switch 94, as will hereinafter more fully appear. The switch 29 will therefore remain open through the block, to continue the danger speed control until terminated.

The danger speed control circuit is established by the opening of the switch 22, whether or not the switch 28 has been opend, and such circuit includes the generator 14, magnet 15, brush 16, contact 40, conductor 41, contact 42, switch 43, magnet 44, conductor 45, switch 46, conductor 47, switch 24, conductor 25, switch 26 and conductor 27. Two requirements are therefore necessary. First, the train must be brought to a stop in order that the brush 16 will engage the contact 40; and, second, the engineer or motorman must close the switch 46, before the brakes will be released, after the switch 22 has been opened by the danger impulse. It will be noted that the switch 22 is disposed in both normal running and caution speed circuits, requiring the completion of the circuit of the magnet 15, under danger conditions, through the switch 46 and conductor 47. When the train has been brought to a stop and the switch 46 is closed, said preliminary danger speed control circuit is closed, thereby energizing the magnet 15, to release the brakes, and the magnet 44 is also energized to raise the switch 43 from the contact 42 against the contact 48, thereby changing the circuit connections from the contact 40 to the danger contact strip 49. As a result, the train can proceed under restricted danger speed, as long as the brush 16 remains on the strip 49, but when proceeding under danger conditions, the engineer or operator must keep the switch 46 closed so as to assure that he is alert. If the permissible danger speed is exceeded, the brush 16 being removed from the strip 49, will deenergize the magnet 15 to apply the brakes, and the magnet 44 being deenergized will let the switch 43 drop, thereby disconnecting the strip 49 from the circuit, so that the train must again be brought to a stop before it can proceed farther, as before. The danger speed is thus enforced, with a penalty in the stopping of the train if the speed is exceeded. The danger lamp 51 is lighted while proceeding under danger speed control.

*Speed control termination.*

When the train is proceeding under either caution or danger speed control and it passes a control station set for clear, the vehicle equipment is brought to clear condition, for terminating speed control, whether both of the switches 28 and 29 are open or only one of them, according to danger or caution conditions. Thus, with the receivers moving along the non-magnetic rail section 80 and the receivers 56 and 57 energized, the inductors having their circuits closed will render the choke coils effective, so that the magnets 52 and 53 are not sufficiently energized to open the switches 32 and 35, the same as under clear conditions as hereinbefore described. However, the cores 58 and 59 moving over the inductor cores 70 and 71, respectively, will slightly or partially increase the voltage in the circuits 54 and 55 and corresponding magnets 52 and 53, whereby the clearing switches 102 and 100, respectively, are closed, and the switches 32 and 35 remaining closed, will result in the clearing circuit being closed. The clearing circuit includes the generator 14, switch 96, conductor 97, switch 98, conductor 99, switch 100, conductor 101, switch 102, conductor 103, magnet 95 and conductor 34. The magnet 95 is thus energized to close the switch 94, which shunts the switches 28 and 29, so that the magnets 30 and 31 are energized for closing the switches 28 and 29, thereby restoring the normal running circuit for clear conditions. When the switch 94 is closed, the circuit of the magnet 30 includes the generator 14, conductor 27, switch 32, conductor 33, magnet 30, conductor 92, switch 94 and conductor 34, while the circuit of the magnet 31 includes the generator 14, conductor 27, switch 35, conductor 36, magnet 31, conductor 93, switch 94 and conductor 34. It is preferable to provide an electric lamp 104 in the conductor 103 which will be flashed when passing a control station with the inductors in clear condition, and an audible signal can be provided also, so that the engineer or motorman will be informed that the inductors were set for clear. Failing to get such signal, the engineer will be advised that caution or danger conditions exist, and if the inductors are removed he will also fail to receive such clear signal when passing a control station. It could therefore be made compulsory for the engineer to receive such clear signal from the lamp or signal member 104 when passing a control station, in the absence of caution or danger conditions being established, to serve as a check on the operativeness of the apparatus.

Three condition control eliminating non-magnetic rail sections.

Figure 2:
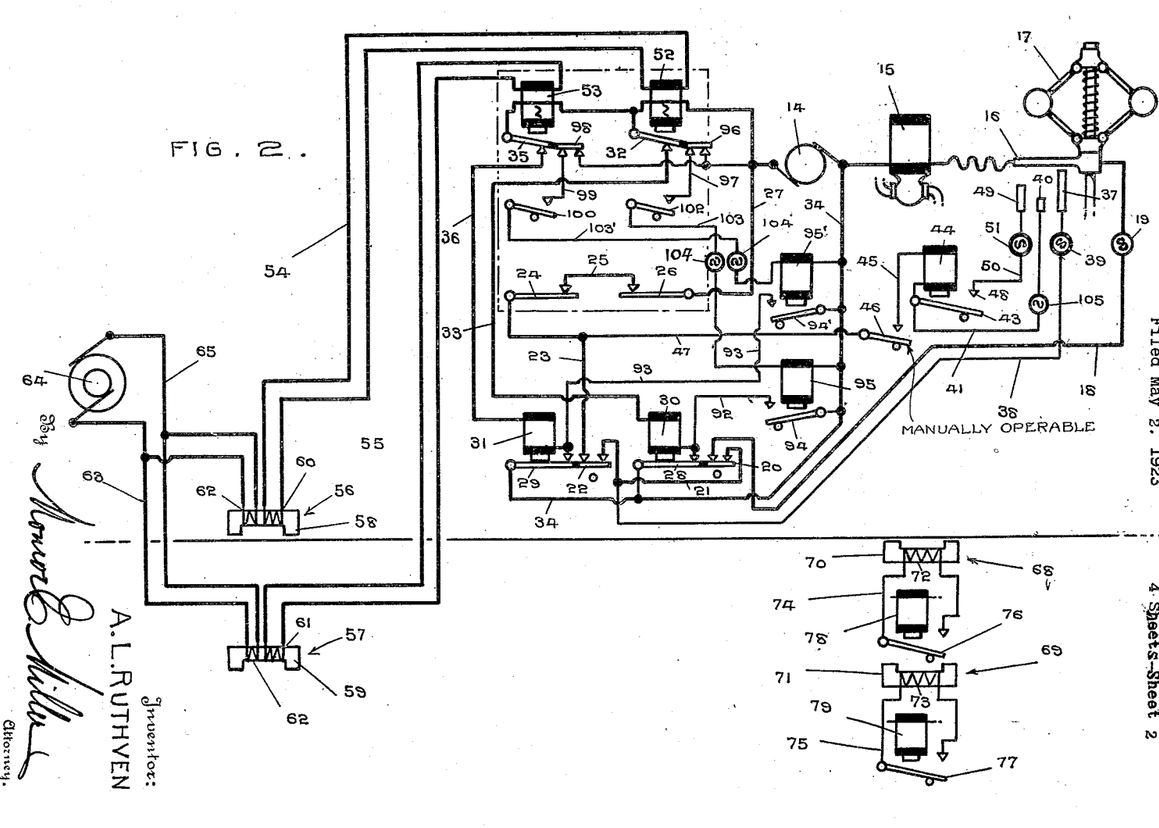
Fig. 2 is a similar view of a modified form of apparatus providing for the same conditions, without using the non-magnetic rail section.

Fig. 2 illustrates a modified form of apparatus in which the receivers 56 and 57 and inductors 68 and 69 are not associated with either rail of the track, but are spaced from the rails at suitable positions either between or at the outer sides of the rails. This eliminates the use of the non-magnetic rail sections at control stations, and, in the vehicle equipment, eliminates the receivers 83, magnets 88 and 89, and other corresponding portions, thereby simplifying the apparatus, although greater clearances must no doubt be provided between the receivers and inductors, with a possible necessity for such receivers and inductors being larger. The use of the non-magnetic rail sections has several advantages, as hereinbefore brought out, but aside from those the modified form of apparatus will operate in substantially the same way, with some variations.

The receivers 56 and 57 not being near the rails are continually energized, inasmuch as the primary coils 62 are permanently connected with the conductors 63 and 65 leading from the alternating current generator 64. As a result, the circuits 54 and 55 are energized with normal voltage by induction from the primary coils 62 to the secondary coils 60 and 61 in said circuits. The magnets 52 and 53 being energized with normal voltage will themselves hold the switches 26 and 24 closed, to assure of said magnets being normally energized, inasmuch as a drop in voltage in either magnet will result in the corresponding safety switch opening, so as to open the normal running circuit. Under the same principle of operation as in the first form, the switches 32 and 35 are opened by the magnets 52 and 53 when the receivers pass over the inductors with the choke coil circuits open, said magnets being energized with full or controlling voltage, whereas when the receivers pass over the inductors with the choke coil circuits closed, the switches 32 and 35 remain closed but the switches 100 and 102 are raised and closed. Thus, the same as in the first form of apparatus, the switches 24 and 26 are held closed by normal voltage in the controlling magnets, the switches 32 and 35 are opened by full or controlling voltage, while the switches 100 and 102 are closed by intermediate voltage slightly above normal voltage.

The second form of apparatus also includes other modifications. Thus, the conductor 41 leading from the contact 40 is connected to the switch 43 without the connection being broken by the raising of the switch against the contact 48, and an electric lamp 105 or other signal device is disposed in the conductor 41, for the purpose of giving a signal if the governor 17 is not operating when proceeding under danger speed control, should the driving connection with the governor become broken. Thus, when a danger signal is received and the train is brought to a stop to move the brush 16 against the contact 40, the circuit through the magnets 15 and 44 is completed, to release the brakes and raise the switch 43 against the contact 48, thereby bringing the danger contact strip 49 into the circuit, as hereinbefore described, but also leaving the contact 40 in the circuit, so that both lamps 51 and 105 are lighted under these conditions, with the train stopped, it being understood that the switch 46 is held closed by the engineer. Now, if the train is started and the governor 17 is not operating, the brush 16 will remain on the contact 40, and the lamp 105 will remain lighted or another signal thus provided, to immediately warn the engineer that the governor is out of commission, it being noted that if the governor is not operating the brush 16 will not be removed from the strip 49 even though the danger speed is exceeded. The governor can also be arranged in full view of the engineer so that he may see same while operating, to be assured that the governor is in working condition when the train is moving.

Another variation included in the second form of apparatus is the speed control terminating devices, provision being made for terminating danger speed control when passing a control station set for caution, in addition to removing all speed control when the control station is set for clear. In other words, if the vehicle is proceeding under danger speed control, a caution speed control can be established so that the speed can be increased from danger to caution speed after passing a control station set for caution.

The running, caution and danger circuits of the magnet 15 are substantially the same as in the first form of apparatus, with the exception as to the conductor 41, and the operation of the second form of apparatus will no doubt be clear in connection with the first form of apparatus, caution and danger conditions being established in substantially the same way in both forms of apparati.

Instead of the switches 96, 98, 100 and 102 all being in series with the clearing magnet 95, as in Fig. 1, the switches 96 and 102 controlled by the magnet 52 are in series with a magnet 95, and the switches 98 and 100 controlled by the magnet 53 are in series with a second magnet 95', said magnets controlling separate clearing switches 94 and 94', respectively. The magnet 95, when energized, closes the switch 94 to connect the conductor 92 with the conductor 34, so that the magnet 30 is energized to pick up the switch 28, and when the magnet 95' is energized it closes the switch 94' to connect the conductor 93 with the conductor 34 so that the magnet 31 is energized. Therefore, when proceeding under danger speed control with the switches 22 and 29 open, and the vehicle passes a control station set for caution, with the switch 77 closed and the switch 76 open, the magnet 52 will be fully energized to open the switch 32, but the magnet 53 will only receive intermediate increase in voltage, so that the switch 35 remains closed, but the switch 100 is closed. The switch 98 remaining closed, and the switch 100 being closed by the slight increase in voltage in the magnet 53, will result in the magnet 95' being energized, the circuit including the generator 14, conductor 27, switch 98, conductor 99, switch 100, conductor 103', magnet 95' and conductor 34. The magnet 95' is therefore energized to close the switch 94', thereby energizing the magnet 31, inasmuch as the switch 94' is parallel with the switch 29. The switch 29 is therefore closed to remove the danger speed control. Although the switch 102 is closed by the energization of the magnet 52 when opening the switch 32, the switch 96 is opened when the switch 102 is closed so that the magnet 95 remains deenergized, and the switch 28 will remain open so that a caution condition will exist after passing the control station, and the vehicle equipment is changed from danger speed control to caution speed control after passing the control station set for caution.

When the train is proceeding either under danger or caution speed control and passes a control station set for clear, with both switches 76 and 77 closed, then the vehicle equipment will be cleared, and the speed control terminated. Thus, the magnets 52 and 53 receive slightly increased current, when the receivers pass the inductors with the choke coil circuits closed, so that the switches 32 and 35 remain closed, although the switches 102 and 100 are closed. Both magnets 95 and 95' are therefore energized, the circuit of the magnet 95' being the same as hereinbefore described, and the circuit of the magnet 95 including the generator 14, conductor 27, switch 96, conductor 97, switch 102, conductor 103, magnet 95 and conductor 34. The switches 94 and 94' are therefore closed to connect the conductors 92 and 93 with the conductor 34, so that both magnets 30 and 31 are energized to close the switches 28 and 29, thereby establishing the normal running circuit.

The conductors 103 and 103' have electric lamps 104 and 104', respectively, therein or other signalling devices, whereby when the danger speed control is terminated the lamp 104' is flashed or other signal given to indicate the fact, and when the caution speed control is terminated the lamp or other signal device 104 gives a visual or audible signal.

*Clear and danger control using non-magnetic rail sections.*

Figure 3:
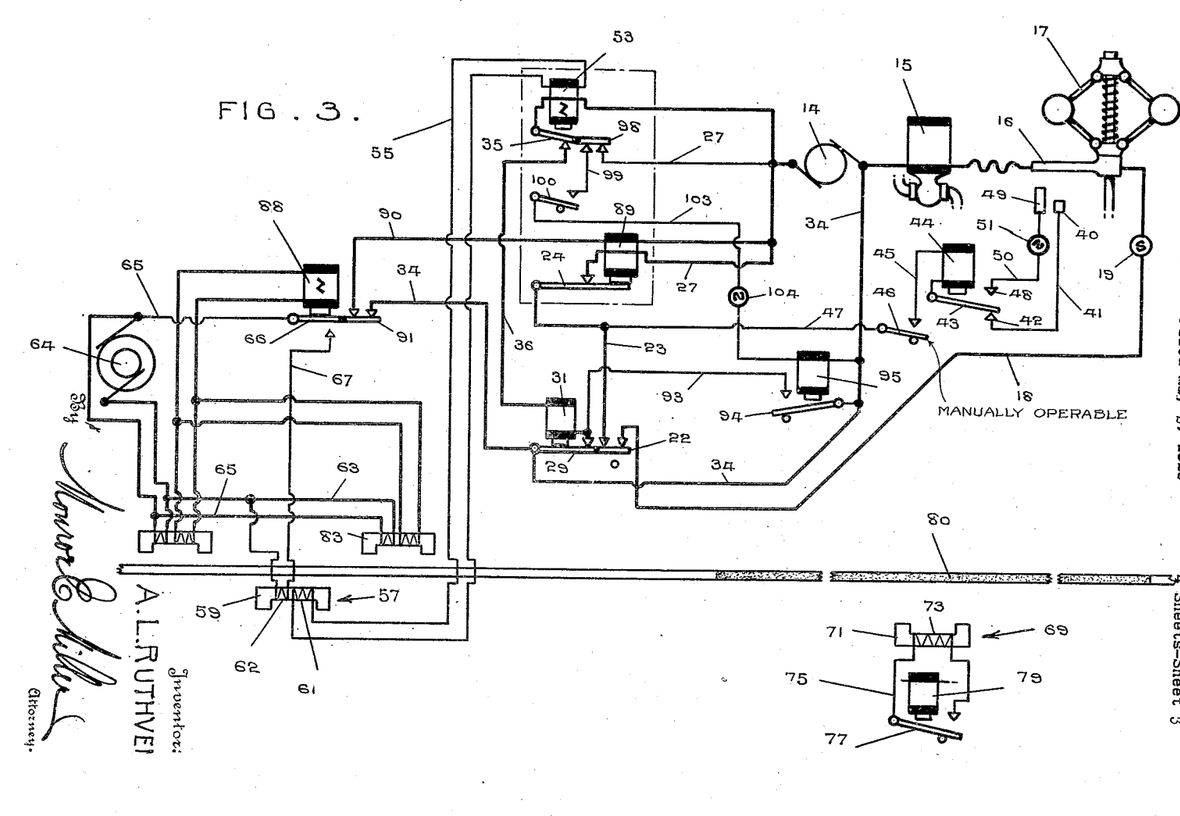
Fig. 3 is a similar view showing a further modification providing for clear and danger conditions only, and using the non-magnetic rail section.

Fig. 3 illustrates the apparatus, using the non-magnetic rail sections, modified for two condition control such as clear and danger, instead of three condition control, such as provided for in the apparati shown in Figs. 1 and 2. The apparatus is thus simplified by eliminating the caution receiver 56, inductor 68, magnet 52 and corresponding parts.

The normal running circuit includes the generator 14, magnet 15, governor operated brush 16, conductor 18, switch 22, conductor 23, safety switch 24, and conductor 27. The receivers 83 being over the iron or magnetic portion of the rail will keep the magnet 88 energized to hold the switch 66 open and the switch 91 closed, the same as in the first form of apparatus, the switch 66 being closed and the switch 91 opened when both receivers 83 are moving over a non-magnetic rail section 80 at a control station. The receiver 57 is therefore energized when passing a control station, for energizing the magnet 53 to open the switch 35 when passing the inductor with the switch 77 open, the switch 100 being closed when the receiver passes the inductor with the switch 77 closed. The safety magnet 89 is normally energized when the switch 91 is closed, and is deenergized when passing a control station, so that the magnet 53 must be energized to hold the safety switch 24 closed.

When the vehicle passes a control station with the inductor circuit open, the switch 35 is opened so as to deenergize the magnet 31 and let the switches 29 and 22 move open, so as to establish the danger speed control circuit, which includes, substantially the same as in the first form of apparatus, the generator 14, magnet 15, brush 16, contact 40, conductor 41, contact 42, switch 43, magnet 44, conductor 45, engineer's switch 46, conductor 47, conductor 23, switch 24 and conductor 27, requiring the train to be brought to a stop and the engineer to hold the switch 46 closed. When the magnet 15 is energized by the stopping of the train, to release the brakes, the magnet 44 moves the switch 43 to connect the strip 49 to the danger speed control circuit so that the train can proceed slowly.

When the train is proceeding under speed control and passes an inductor set for clear, the switch 100 being closed with the switch 35 remaining closed, will complete the clearing circuit including the generator 14, conductor 27, switch 98, conductor 99, switch 100, conductor 103, magnet 95 and conductor 34, so that the magnet 95 is energized and the switch 94 closed to complete the circuit of the magnet 31. The magnet 31 is therefore energized to again close the switches 29 and 32.

*Two condition control eliminating non-magnetic rail sections.*

Fig. 4 shows a more simplified apparatus providing for clear and danger conditions, without the use of non-magnetic rail sections. Thus, the non-magnetic rail sections, receivers 83, magnets 88 and 89, and other corresponding parts of Fig. 3 are eliminated, and the receiver 57 is continually energized but is spaced from both rails of the track, as well as the inductor 69, and they can be disposed between or outside of the rails. The magnet 53 is thus continually energized with normal voltage to hold the safety switch 24 closed, and when the receiver passes the inductor with the inductor circuit opened or broken, the magnet 53 is energized to open the switch 35 for obtaining danger condition, the same as with the apparatus shown in Fig. 3, the speed control being terminated in the same manner when passing the inductor set for clear. When passing an inductor set for clear, while travelling under speed control, the switch 100 is closed by the magnet 53 but the switches 35 and 98 remain closed so that the magnet 95 is energized to close the clearing switch 94.

*Reversing arrangement.*

Fig. 7 illustrates diagrammatically how provision can be made for control with the locomotive or vehicle travelling in either direction, that is, with either end forward or with travel in opposite directions on a single track. Thus, two sets of receivers 110 and 111, can be used, one over each rail, with the wires run in cables 112 and 113, respectively, to a suitable reversing switch 114 assembled with the reversing lever 115 of the locomotive or engine, from which the wires lead in a cable 116 to the magnets 52, 53 and 88. Thus, when the vehicle is moving in one direction, the switch 114 connects the wires of the cables 112 and 116 to render the set of receivers 110 operable, whereas when the vehicle is reversed, the receivers 111 are rendered operable by connecting the wires of the cable 116 with the wires of the cable 113. This will take care of the movement of the locomotive or engine with either end forward, and if there are two opposite sets of inductors for two-way traffic on a single track, then the reversing arrangement will make provision for the proper control of the train according to the direction of travel, as well recognized in the art.

Having thus described the invention, what is claimed as new is:—

1. Vehicle controlling apparatus including an inductor on the track, means for rendering same effective and partly ineffective, a responsive device on the vehicle having a receiver cooperable inductively with said inductor, said device being arranged to be energized to one abnormal degree when the receiver passes the inductor in partly ineffective condition and to be energized to another abnormal degree when the receiver passes the inductor in effective condition, and vehicle controlling means controlled by said responsive device for obtaining a predetermined vehicle condition when said device is energized to the secondnamed degree and operable for eliminating such vehicle conditions when said device is energized to the firstnamed degree in passing the inductor in partly ineffective condition.

2. Vehicle controlling apparatus including an inductor on the track, means for rendering same effective and partly ineffective, a responsive device on the vehicle having a receiver cooperable inductively with said inductor, said device being arranged to be energized to one abnormal degree when the receiver passes the inductor in partly ineffective condition and to be energized to another abnormal degree when the receiver passes the inductor in effective condition, and vehicle controlling means including members controlled by said device for obtaining and eliminating a predetermined vehicle condition, one member being operable when said device is energized to the secondnamed degree for obtaining such vehicle condition and the other member being operable when said device is energized to the firstnamed degree for eliminating such vehicle condition in passing the inductor in partly ineffective condition.

3. Vehicle controlling apparatus including an inductor on the track, means for rendering same effective and partly ineffective, a responsive device on the vehicle having a receiver cooperable inductively with said inductor, said device being arranged to be energized to a normal degree when the receiver approaches the inductor, to be energized to a second degree when the receiver passes the inductor in partly ineffective condition and to be energized to a third degree when the receiver passes the inductor in effective condition, and vehicle controlling means controlled by said device operable to produce a predetermined vehicle condition when said device is energized to the third degree, to eliminate such vehicle condition when said device is energized to the second degree in passing the inductor in partly ineffective condition, and to obtain a predetermined condition when said device is not energized to the normal degree with the receiver approaching the inductor.

4. Train controlling apparatus including an inductor on the track, means for rendering same effective and partly ineffective, a responsive device on the vehicle having a receiver cooperable inductively with said inductor, said device being arranged to be energized to a normal degree when the receiver approaches the inductor, to be energized to a second degree when the receiver passes the inductor in partly ineffective condition and to be energized to a third degree when the receiver passes the inductor in effective condition, and vehicle controlling means including three members controlled by said device, one member being operable when said device is energized to the third degree for establishing a predetermined vehicle condition, another member being operable when said device is energized to the second degree for eliminating such vehicle condition in passing the inductor in partly ineffective condition, and the third member being operable for obtaining a predetermined condition when said device is not energized to the normal degree when the receiver approaches the inductor.

5. Vehicle controlling apparatus including an inductor on the track having a choke coil, means for opening and closing the circuit of said coil, a responsive device on the vehicle having a receiver cooperable inductively with said inductor, said device being arranged to be energized to one abnormal degree when the receiver passes the inductor with the choke coil circuit closed and to be energized to another abnormal degree when the receiver passes the inductor with the choke coil circuit open, and vehicle controlling means controlled by said responsive device for obtaining a predetermined vehicle condition when said device is energized to the secondnamed degree and operable for eliminating such vehicle condition when said device is energized to the firstnamed degree in passing the inductor with the choke coil circuit closed.

6. Vehicle controlling apparatus including an indicator on the track having a choke coil, means for opening and closing the circuit of said coil, a responsive device on the vehicle having a receiver cooperable inductively with said inductor, said device being arranged to be energized to one abnormal degree when the receiver passes the inductor with the choke coil circuit closed and to be energized to another abnormal degree when the receiver passes the inductor with the choke coil circuit open, and vehicle controlling means including members controlled by said device for obtaining and eliminating a predetermined vehicle condition, one member being operable when said device is energized to the secondnamed degree for obtaining such vehicle condition and the other member being operable when said device is energized to the firstnamed degree for eliminating such vehicle condition with passing the inductor with the choke coil circuit closed.

7. Vehicle controlling apparatus including an inductor on the track having a choke coil, means for opening and closing the circuit of said coil, a responsive device on the vehicle having a receiver cooperable inductively with said inductor, said device being arranged to be energized to a normal degree when the receiver approaches the inductor, to be energized to a second degree when the receiver passes the inductor with the choke coil circuit closed and to be energized to a third degree when the receiver passes the inductor with the choke coil circuit open, vehicle controlling means controlled by said device operable to produce a predetermined vehicle condition when said device is energized to the third degree and to eliminate such vehicle condition when said device is energized to the second degree in passing the inductor with the choke coil circuit closed, and safety means controlled by said device for obtaining a predetermined condition when said device is not energized to the normal degree when the receiver approaches the inductor.

8. Train controlling apparatus including an inductor on the track having a choke coil, means for opening and closing the circuit of said coil, a responsive device on the vehicle having a receiver to cooperate inductively with said inductor, said device being arranged to be energized to a normal degree when the receiver approaches the inductor, to be energized to a higher degree when the receiver passes the inductor with the choke coil circuit closed and to be energized to a still higher degree when the receiver passes the inductor with the choke coil circuit open, vehicle controlling means including two members controlled by said device, one member being operable when said device is energized to the thirdnamed degree for establishing a predetermined vehicle condition, the other member being operable when said device is energized to the secondnamed degree for eliminating such vehicle condition in passing the inductor with the choke coil circuit closed, and safety means controlled by said device for obtaining a predetermined condition if said device is not energized up to the normal degree when approaching the inductor.

9. Vehicle controlling apparatus including an inductor on the track, means for rendering said inductor effective and partly ineffective, a responsive device on the vehicle having a receiver cooperable inductively with said inductor, said device being arranged to be energized to a normal degree when the receiver approaches the inductor and to be energized to an abnormal degree when the receiver passes the inductor in effective condition, vehicle controlling means controlled by said device to produce a predetermined vehicle condition when said device is energized to such abnormal degree, safety means for obtaining a predetermined condition when said device is not energized to the normal degree when the receiver approaches the inductor, and means for preventing control of the responsive device by the receiver excepting when passing predetermined portions of the track including the portion where the inductor is located.

10. Vehicle controlling apparatus including an inductor on the track having a choke coil, means for opening and closing the circuit of said coil, a responsive device on the vehicle having a receiver cooperable inductively with said inductor, said device being arranged to be energized to a normal degree when the receiver approaches the inductor and to be energized to a higher degree when the receiver passes the inductor with the choke coil circuit open, vehicle controlling means controlled by said device to produce a predetermined vehicle condition when said device is energized to the secondnamed degree, safety means for obtaining a predetermined condition when said device is not energized up to the normal degree when the receiver approaches the inductor, and means for preventing control of the responsive device by the receiver excepting when passing predetermined portions of the track including the portion where the inductor is located.

11. Vehicle controlling apparatus including a non-magnetic portion in the vehicle track at each control station, a plurality of controlling means at each control station to be rendered effective and ineffective, a plurality of vehicle carried means responsive to said controlling means for obtaining different vehicle conditions, and means independent of the secondnamed means for eliminating control of the secondnamed means from the track when moving along magnetic portions of the track.

12. Vehicle controlling apparatus including a non-magnetic portion in the vehicle track at each control station, a plurality of inductors associated with each of said non-magnetic portions of the track, a plurality of vehicle carried receivers cooperable inductively with said inductors, vehicle controlling means controlled by said receivers for obtaining different conditions, and means independent of said receivers inductively cooperable with the track for eliminating control of said means by the receivers when moving along magnetic portions of the track.

13. Vehicle controlling apparatus including a non-magnetic portion in the vehicle track at each control station, a plurality of inductors associated with each of said portions and each composed of a core and a choke coil thereon, means for opening and closing the circuits of said coils, a plurality of vehicle carried receivers cooperable inductively with said inductors, vehicle controlling means controllable by said receivers for obtaining different vehicle controlling conditions and operable for obtaining said vehicle conditions when the receivers are affected in passing the inductors with the choke coil circuits open, and means independent of said receivers cooperable inductively with the track for eliminating control of the secondnamed means by the receivers when moving along magnetic portions of the track.

14. Vehicle controlling apparatus including a non-magnetic section in the track at each control station, a control inductor associated with said section, and electrically energized receiver carried by the vehicle to cooperate inductively with said inductor when passing the control station, electrical means influenced by said receiver, when passing the control station, for obtaining a predetermined vehicle condition, rail responsive means cooperable inductively with the track, and means controlled by said responsive means and operable for eliminating the control of said electrical means by the receiver when the responsive means and receiver are moving along magnetic portions of the track.

15. Vehicle controlling apparatus including a non-magnetic section in the track at each control station, an inductor associated with said section, means for rendering the inductor effective and ineffective, an electrically energized receiver carried by the vehicle and cooperable inductively with said inductor, electrical means to be controlled by the receiver for obtaining a predetermined vehicle condition, rail responsive means carried by the vehicle cooperable inductively with the track, and means controlled by said responsive means operable for eliminating and establishing control of said electrical means by the receiver when said responsive means and receiver move along magnetic and non-magnetic portions of the track, respectively.

16. Vehicle controlling apparatus including a non-magnetic section in the track at each control station, an inductor associated with said section, means for rendering the inductor effective and ineffective, an electrically energized receiver carried by the vehicle to cooperate inductively with said inductor when passing the control station, electrical means controlled by said receiver when passing the control station for obtaining a predetermined condition, rail responsive means in advance and in rear of said receiver cooperable inductively with the track, and means controlled by said rail responsive means for eliminating the control of said electrical means by the receiver when said responsive means is moving along a magnetic portion of the track.

17. Vehicle controlling apparatus including a non-magnetic section in the track at each control station, an inductor associated with said section, means for rendering the inductor effective and ineffective, a vehicle carried receiver to cooperate inductively with said inductor, electro-magnetic means to be controlled by said receiver, means controlled by said electro-magnetic means for obtaining a predetermined vehicle condition, rail responsive means carried by the vehicle and cooperable inductively with the track, means controlled by said rail responsive means for establishing and eliminating control of said electro-magnetic means by the receiver when the responsive means and receiver move along non-magnetic and magnetic portions of the track, a safety member to be held by said electro-magnetic means and operable for obtaining a predetermined condition if released by a sub-normal energization of said electro-magnetic means, and means for holding said safety member against release movement when the last-named means is operable for eliminating the control of the electro-magnetic means from the receiver.

18. Vehicle controlling apparatus including a non-magnetic section in the track at each control station, an inductor associated with said section, means for rendering the inductor effective and ineffective, a receiver carried by the vehicle and cooperable inductively with said inductor, electro-magnetic means to be controlled by said receiver, means controlled by said electro-magnetic means for obtaining a predetermined vehicle condition, rail responsive means cooperable inductively with the track, a switch device controlled by said responsive means for establishing and eliminating control of said electro-magnetic means by the receiver when said responsive means and receiver move along non-magnetic and magnetic portions of the track, respectively, a safety member to be held by said electro-magnetic means for obtaining a predetermined condition when said member is released by a sub-normal energization of said electro-magnetic means, and means controlled by said switch device for holding said member when said device is in position to aliminate control of the electro-magnetic means by the receiver.

19. Vehicle controlling apparatus including a non-magnetic section in the track at each control station, an inductor associated with said section, means for rendering the inductor effective and ineffective, a vehicle carried responsive device having a receiver cooperable inductively with said inductor and having an electro-magnet to be controlled by said receiver, a switch controlling said device movable to one position to eliminate control of said electro-magnet by the receiver and movable to another position for establishing control of said electro-magnet by the receiver, rail responsive means carried by the vehicle and cooperable inductively with the track, said responsive means controlling said switch to move it to the firstnamed and secondnamed positions when said responsive means and receiver move along magnetic and non-magnetic portions of the track, respectively, a safety member to be held by said magnet and to establish a predetermined condition when said member is released, and means for holding said member when said switch is in its firstnamed position.

20. Vehicle controlling apparatus including a non-magnetic section in the track at each control station, an inductor associated with said section, means for rendering the inductor effective and ineffective, a vehicle-carried receiver to cooperate inductively with said inductor, a control electro-magnet to be controlled by the receiver, means controlled by said magnet for obtaining a predetermined vehicle condition, a switch for eliminating control of said magnet by the receiver in one position of the switch and for establishing control of said magnet by the receiver in another position of the switch, rail responsive means in advance and in rear of said receiver cooperable inductively with the track, and a magnet controlled by said responsive means for holding said switch in the first-named position when said responsive means and receiver move along magnetic portions of the track.

21. Vehicle controlling apparatus including a non-magnetic section in the track at each control station, an inductor associated with said section, means for rendering the inductor effective and ineffective, a vehicle-carried receiver to cooperate inductively with said inductor, a control electro-magnet to be controlled by the receiver, means controlled by said magnet for obtaining a predetermined vehicle condition, a switch for eliminating control of said magnet by the receiver in one position of the switch and for establishing control of said magnet by the receiver in another position of the switch, rail responsive means in advance and in rear of said receiver cooperable inductively with the track, a magnet controlled by said responsive means for holding said switch in the firstnamed position when said responsive means and receiver move along magnetic portions of the track, a safety member to be held by the firstnamed magnet and operable to obtain a predetermined condition when released by the subnormal energization of said magnet, and means for holding said member when said switch is in its firstnamed position.

22. Vehicle controlling apparatus including two inductors on the track at each control station, means for rendering said inductors effective and partly ineffective, responsive devices on the vehicle each having a receiver cooperable inductively with the corresponding inductor, each device being arranged to be energized to one abnormal degree when the receiver thereof passes the corresponding inductor in partly ineffective condition and to be energized to another abnormal degree when the receiver passes the inductor in effective condition, means controlled by said devices for obtaining different vehicle conditions when one or the other of said devices is energized to the secondnamed degree, and means controlled by said devices for eliminating either vehicle condition when said devices are energized to the firstnamed degree in passing the inductors in partly ineffective condition accordingly.

23. Vehicle controlling apparatus including a pair of inductors on the track at each control station, each inductor having a choke coil, means for opening and closing the circuits of said coils selectively, responsive devices on the vehicle each having a receiver cooperable inductively with the corresponding inductor, each device being arranged to be energized to one abnormal degree when the receiver passes the inductor with the choke coil circuit closed and to be energized to another abnormal degree when the receiver passes the inductor with the choke coil circuit open, means controlled by said devices for obtaining different predetermined vehicle conditions when one or the other of said devices is energized to the secondnamed degree, and means also controlled by said devices for eliminating either vehicle condition when the receivers pass the inductors with the choke coil circuits closed accordingly.

In testimony whereof I hereunto affix my signature.

ALFRED L. RUTHVEN.